June 27, 1939.　　　J. H. MURCH　　　2,163,619

CONTAINER

Filed May 25, 1935

INVENTOR
John H. Murch
BY Ivan W. Thornburgh
Charles H. Cone
ATTORNEYS

Patented June 27, 1939

2,163,619

UNITED STATES PATENT OFFICE 2,163,619

CONTAINER

John H. Murch, East Orange, N. J., assignor to American Can Company, New York, N. Y., a corporation of New Jersey Application May 25, 1935, Serial No. 23,485

4 Claims. (Cl. 220—75)

The present invention relates to metal containers or cans and to metal can bodies and has particular reference to a continuous stitch or overlapped spot weld construction in the side seam which seam is created without any extrusion of the metal at its ends, thus avoiding subsequent manufacturing difficulties.

In the early years of making cans having soldered side seams manufacturing difficulties were encountered when there existed even the smallest amount of projection or extrusion of any part of the side seam such as might be produced by misalignment of the overlapping parts of the seam. Again, an extrusion difficulty of slightly different character was sometimes experienced in a solder excess between the end laps of the side seam and when the can end was applied this excess solder was extruded into the double seam. Many side seam notch patents show how important this extrusion trouble was for by notching the blank the extrusion was reduced.

Many patents show the welding of sheet material and some of these relate to relatively thin sheet material for cans but notwithstanding these patents no practical, commercially welded side seam cans have been made as far as can be ascertained.

Extrusion or projection of metal may be said to be inherent in continuous resistance spot or stitch welding because the application of the full force of welding heat and pressure at the extreme ends of the overlapped parts of the seam results in too great a concentration of heat and pressure in too small an area. In other words the end stitches or spots of the weld are so close to the ends of the seam that extrusion of metal necessarily follows.

It is to the construction of a continuous stitch or spot welded side seam having no projections or extrusion of metal at the ends of the seam and to a seam which is effectively welded throughout its extent, that the present invention is particularly concerned.

An object, therefore, of the present invention is the provision of a metal can or can body of relatively light gauge sheet material having a welded side seam, the engaged elements of which are secured together in an intimate and permanent union by means of a series of stitch or spot welds. The end spots or stitches are so placed relative to the ends of the seam and the effective welding heat and the effective welding pressure at the seam ends during the welding operation are such that there will not be any metal extrusion of the welded seam parts.

A further object of the invention is the provision of a welded side seam in which the first and last stitches or spot welds are so placed, relative to the ends of the seam, that there is sufficient heat and pressure effective at the adjacent extreme seam ends to make the proper weld but not enough to cause extrusion of metal beyond the seam ends.

Another object is the provision of a metal can having a welded side seam of the character described, the end stitch or spot of the side seam at one or both ends of the can being completely included in the double seam or seams joining can ends and can body.

Numerous other objects and advantages of the invention will be apparent as it is better understood from the following description, which, taken in connection with the accompanying drawing, discloses a preferred embodiment thereof.

Referring to the drawing.

Figure 2:
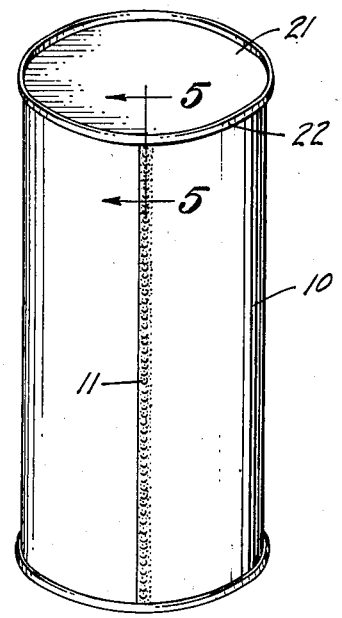
Fig. 2 is a perspective view of a sealed can having such a body construction.
Figure 3:
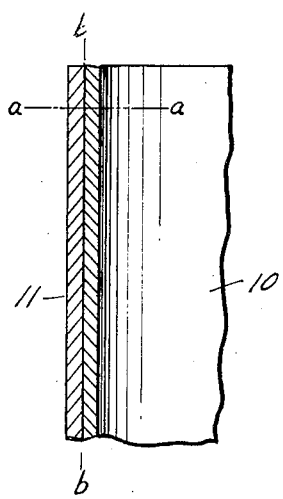
Fig. 3 is an enlarged sectional detail of a portion of the welded side seam as viewed along the section line 3—3 in Fig. 1.
Figure 4:
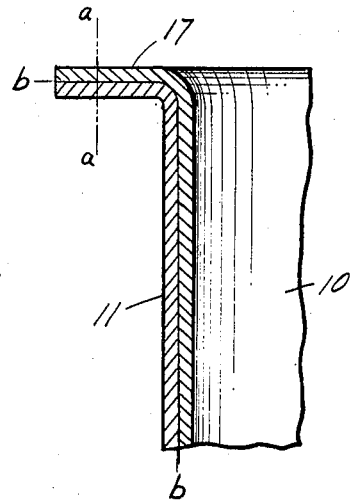
Figure 5:
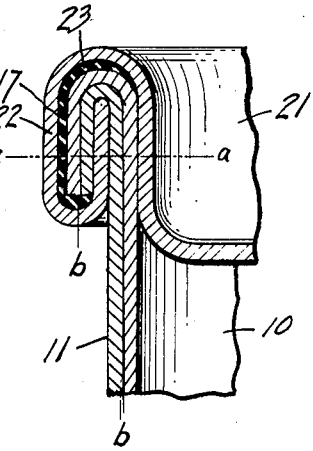

Fig. 4 is a similar view illustrating the end of the body flanged preparatory to uniting it with a can end or cover; and Fig. 5 is a sectional detail of one end of the completely formed can drawn to the same scale as Figs. 3 and 4 and showing the position of an end of the welded side seam within the double seam joint formed between the can body and its cover, this view being a section taken along the line 5—5 in Fig. 2.

A welded side seam can has been found adaptable for the packaging of beer in cans and possesses many advantages over bottles for this product. Such a can, however, must be hermetically tight and must be able to withstand internal pressures sometimes as high as 100 pounds to the square inch and the side seam when welded must be free of projection or extrusion of metal at the seam ends.

Having this in mind a welded side seam can suitable for holding beer has been disclosed in the drawing as an exemplification of the invention and such a can will be described in the pages that follow. This can is of a single metal, such as black iron and may be lined inside with a suitable protective coating and outside with a rust resistant or a lithographic display or other form of coating. Such coatings form no part of the present invention and will not be further described.

Figure 1:
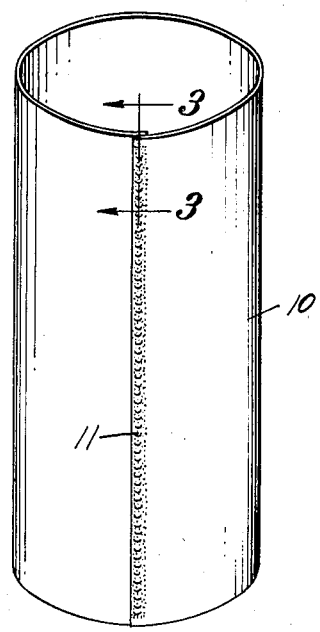
Figure 1 is a perspective view of a can body having a welded side seam and embodying the present invention.

A tubular can body 10 (Fig. 1) is formed with an overlapped and welded side seam 11. This side seam (see also Fig. 3) is composed of a series of welded stitches or spots which are produced by the resistance welding method. The centers of these spots are spaced apart and the fused areas of adjacent spots overlap. The center line of the end spot at one end of the seam is indicated by the broken line a—a (Figs. 3, 4 and 5) which is located a definite distance from the end of the body. The line b—b indicates the line of junction of the overlapped parts of the welded seam.

When the welding heat is first applied to the overlapped parts 11 of the body to produce the seam of the instant invention, this welding heat is concentrated at the first stitch a—a and the concentrated pressure of welding is greatest at that particular place. Such welding heat rapidly spreads in all directions but at the moment of welding the pressure on either side of the center line a—a is necessarily less than at the concentrated line of weld. In fact the pressure away from such a line may be said to be the result of the stiffness of the plate used in the seam parts and is proportionally less as to the distance from the stitch.

This first stitch therefore is spaced inwardly from the end of the seam just that amount which will give the effective welding heat and pressure at the terminal edge of the end of the seam that will produce the proper union of the seam parts but will not cause any extrusion of the metal. In the same way the last end stitch weld is spaced inwardly from the seam end to produce the same results. In other words the boundary of the fused areas of these end weld stations or spots terminate at the end edges of the blank composing the body so that the fused areas are fully contained within such edges.

After a can body 10 has been produced with its completed side seam, one or both ends of the body are flanged in the usual way as at 17 (Fig. 4). The end stitch a—a, being relatively close to the end of the body, is contained within the flange 17.

The flanged body is then provided at one or at each end with a can cover or can end 21 and the end flanges and the flanges of the body are then interfolded and united in the usual double seam joint 22 as shown in Fig. 5. Where a hermetic can is desired a gasket or lining compound 23 is also interfolded in the double seam in the usual manner.

It will be observed that the end stitch of the welded side seam is fully confined within the double seam 22 of the finished can and this construction provides a can having maximum strength as it has been found that the welded side seam is fully as strong or stronger than any of the can walls and therefore such a can is well adapted to the packaging of beer or of a variety of pasteurized, sterilized or other products.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A metallic can body comprising a blank having its side edges engaged in a welded side seam extending longitudinally of the body, said welded side seam consisting of a series of spot welds located along the length of the seam and having the metal of said side edges interfused to form a hermetic joint, the centers of said spot welds being spaced apart with areas of adjacent spots overlapping, the outermost of said spot welds having their centers spaced inwardly from the end edges of said body and having the boundary of their fused areas terminating at said end edges and with such fused areas fully contained therein.

2. A metallic can body comprising a blank having its two side edges overlapped and engaged in a lapped welded side seam extending longitudinally of the body, said welded side seam consisting of a series of spot welds located along the length of the seam and having the metal of said overlapped side edges interfused to form a hermetic joint, the centers of said spot welds being spaced apart with areas of adjacent spots overlapping, the outermost of said spot welds having their centers spaced inwardly from the end edges of said body and having the boundary of their fused areas terminating at said end edges and with such fused areas fully contained therein.

3. A flanged metallic can body comprising a blank having its side edges engaged in a welded side seam extending longitudinally of the body, said welded side seam consisting of a series of spot welds located along the length of the seam and having the metal of said side edges interfused to form a hermetic joint, the centers of said spot welds being spaced apart with areas of adjacent spots overlapping, the outermost of said spot welds having their centers spaced inwardly from the end edges of said body and having the boundary of their fused areas terminating at said end edges and with such fused areas fully contained therein, the body end edges being flanged outwardly to receive end closures thereon with said outermost spot welds located in the outwardly extending flanges.

4. A metallic container comprising a body having an overlapped side seam which is welded throughout the longitudinal extent of the body, said welded side seam consisting of a series of spot welds located along the length of the seam and having the metal of said side edges interfused to form a hermetic joint, the centers of said spot welds being spaced apart with areas of adjacent spots overlapping, the outermost of said spot welds having their centers spaced inwardly from the end edges of said body and having the boundary of their fused areas terminating at said end edges and with such fused areas fully contained therein, and a can end united to the said can body in a double seam with a said outermost spot weld enclosed within said double seam.

JOHN H. MURCH.